United States Patent Office 3,363,472
Patented Jan. 16, 1968

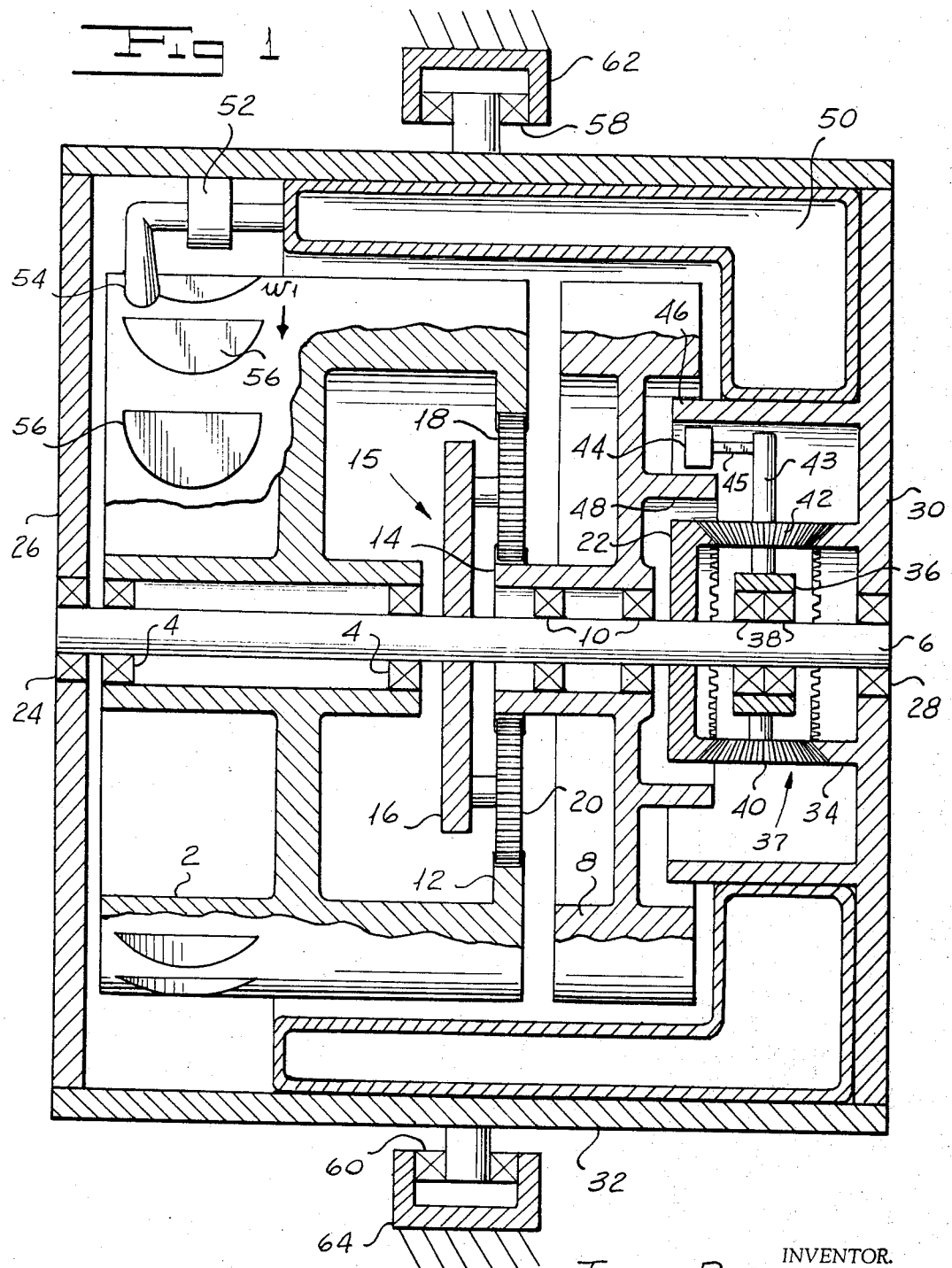

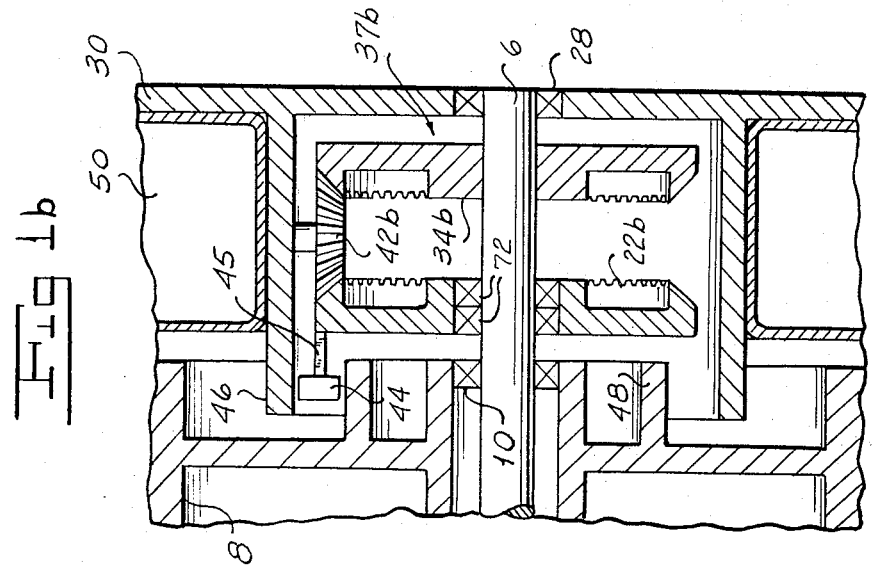
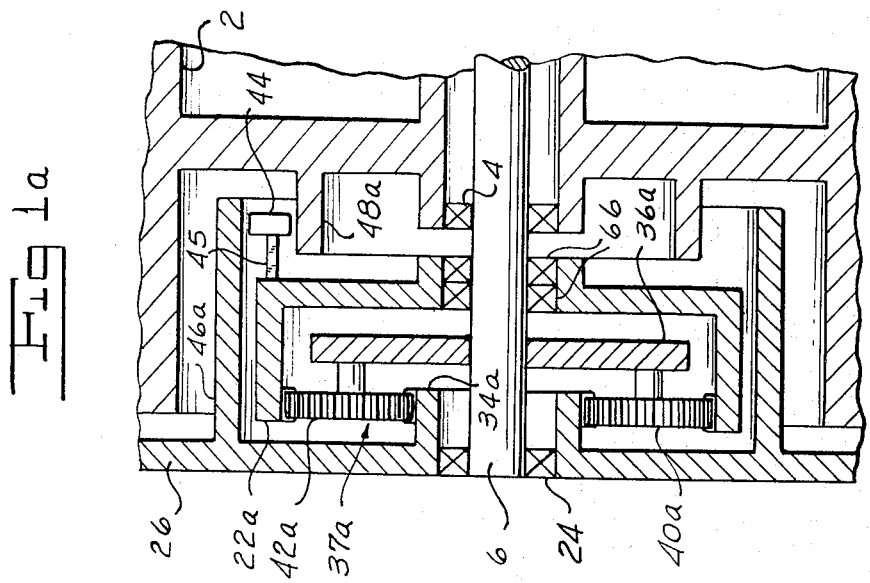

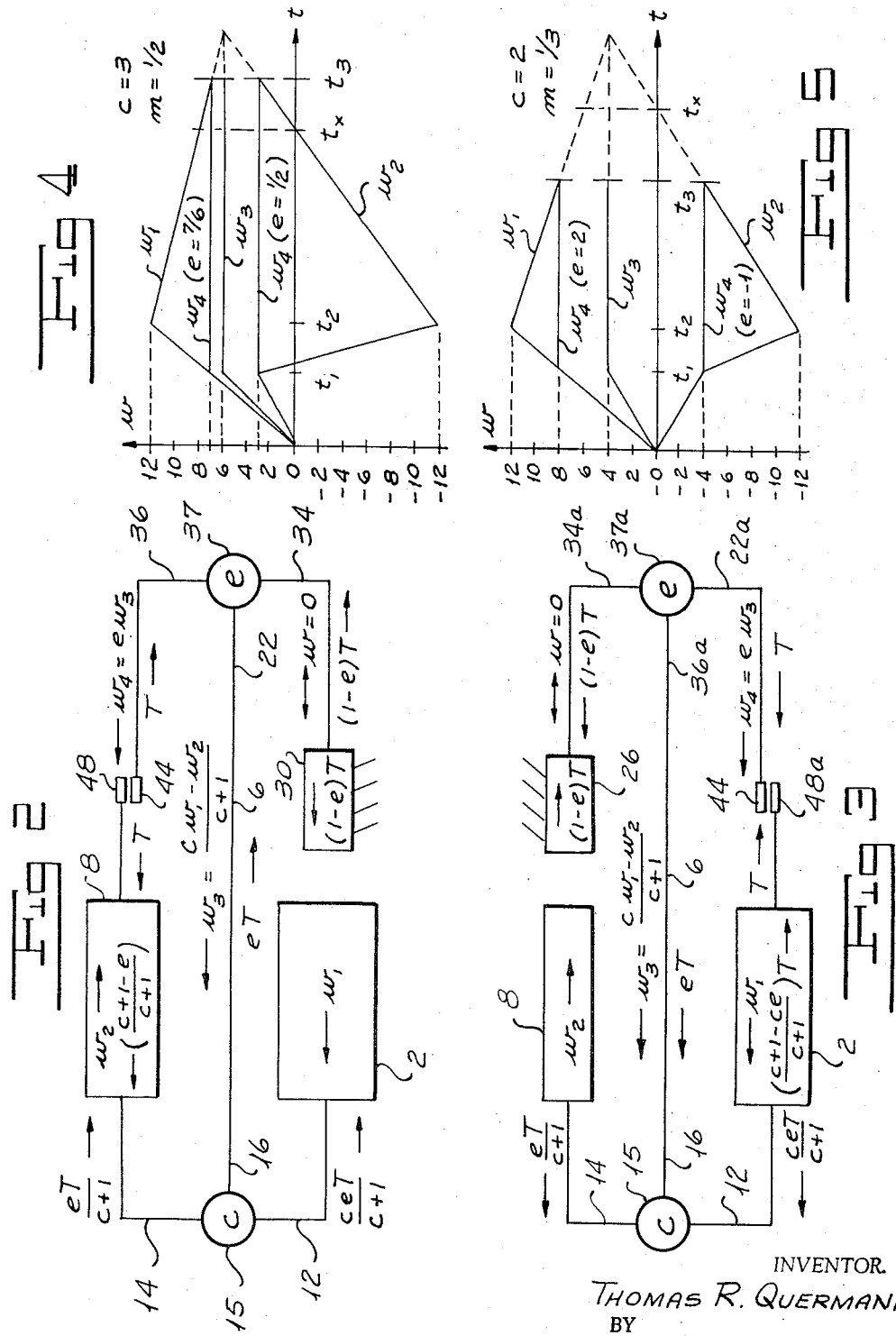

3,363,472
CONSTANT-ANGULAR-MOMENTUM GYROSCOPE
Thomas R. Quermann, Huntington Station, N.Y., assignor to United Aircraft Corporation, East Hartford, Conn., a corporation of Delaware
Filed Dec. 10, 1963, Ser. No. 329,468
11 Claims. (Cl. 74—5.7)

My invention relates to gyroscopes and more particularly to constant-angular-momentum gyroscopes.

To maintain the accurate functioning of single-degree-of-freedom gyroscopes requires that the angular momentum of the rotor remain constant. For rotors driven by synchronous alternating-current motors the regulation of rotor speed depends only upon maintaining the supply frequency constant. For rotors excited by direct-current or induction motors, which have inherently poor speed regulation, centrifugal switches are employed. These switches create electrical noise and have limited life.

The problem of maintaining constant the rotor angular momentum in a single-degree-of-freedom gyroscope is especially acute in stored energy gyroscopes, which are to be used for a relatively short time period of the order of magnitude of one to five minutes. One method of maintaining constant the rotor angular momentum in a stored-energy single-degree-of-freedom gyroscope would be to provide an external flywheel which is selectively coupled by a centrifugal clutch through a universal joint to the gimbal-mounted gyroscope rotor. Rotor speed regulation may be maintained as long as the flywheel speed exceeds the rotor speed. Such system has many disadvantages. At the time the flywheel speed equals the rotor speed a large amount of energy remains stored in the flywheel. The flywheel takes up appreciable space and must have appreciable weight. Yet the flywheel provides no gyroscopic function. An even more serious disadvantage arises from the friction and extraneous gimbal torques introduced by the universal joint which couples the external flywheel to the gimbal-mounted rotor.

One object of my invention is to provide a constant-angular-momentum single-degree-of-freedom gyroscope of the stored energy type wherein substantially all the energy at the end of the useful time period is employed gyroscopically.

A further object of my invention is to provide a constant-angular-momentum single-degree-of-freedom-gyroscope of the stored energy type which eliminates friction and extraneous gimbal torques by mounting all rotating elements on the gimbal.

Other and further objects of my invention will appear from the following description.

In general my invention contemplates the provision of a pair of gimbal-mounted gyroscope rotors operating at different speeds. The two rotors are coupled through planetary or differential gearing, the rotors being connected to the differential side gears or to the sun and ring planetary gears. The rotors should have a ratio of angular inertias proportional to the diameters of their associated side gears. With this relationship observed, the speed of the spider or planet carrier is then proportional to the net angular momentum of the two rotors irrespective of their relative speeds. The system retains free energy so long as a speed difference exists between the rotors. I employ a centrifugal clutch connected to the spider or planet carrier which couples such member selectively to one of the rotors and the gimbal, thereby to maintain constant the spider speed and hence the net angular momentum of the two rotors even though their relative speeds be changing.

In the accompanying drawings which form part of the instant specification and in which like reference numerals are used to indicate like parts in the various views:

FIGURE 1 is a sectional view with parts broken away showing a first embodiment of my invention.

FIGURE 1a is a fragmentary sectional view of a second embodiment of my invention.

FIGURE 1b is a fragmentary sectional view of an alternative form of the first embodiment of my invention.

FIGURE 2 is a generalized schematic view of the first embodiment of my invention showing the reaction torques on the various elements.

FIGURE 3 is a generalized schematic view showing the reaction torques on the various elements for the second embodiment of my invention.

FIGURES 4 and 5 show the variation with time of the rotational speeds of the elements for the various embodiments of my invention.

Referring now more particularly to FIGURE 1 of the drawings, a first rotor 2 is supported by bearings 4 on shaft 6. A second rotor 8 is supported by bearings 10 on shaft 6. The masses of rotors 2 and 8 are essentially concentrated in their rims. In the embodiment shown rotor 2 is three times as long as rotor 8 and accordingly has three times the angular inertia. The rim of rotor 2 is provided with internal teeth forming a ring gear 12 of a planetary differential 15. The hub of rotor 8 is provided with external teeth forming a sun gear 14. The ring gear 12 has a diameter three times that of sun gear 14. A planet carrier 16 is secured to shaft 6. A plurality of equally spaced planet pinions 18 and 20 engage the ring gear 12 of rotor 2 and the sun gear 14 of rotor 8. Planet pinions 18 and 20 are coupled to the planet carrier 16 by a pair of stub shafts. The side gear 22 of a differential 37 is also secured to shaft 6. One end of shaft 6 is supported by a bearing 24 mounted in a circular end plate 26. The other end of shaft 6 is supported by a bearing 28 mounted in circular end plate 30. Circular end plates 26 and 30 engage a hollow cylindrical housing 32. A second differential side gear 34 is formed in end plate 30. A differential spider 36 is rotationally supported on shaft 6 by bearings 38. Spider pinions 40 and 42 engage side gears 22 and 34 and are rotationally supported on the spider 36 by a pair of stub shafts. One stub shaft is provided with an extension 43 which mounts a leaf spring 45 to which is secured a centrifugal clutch 44. Clutch 44 selectively engages the interior surface of a hollow cylindrical extension 46 of end plate 30 when the speed of the spider 36 is too high and selectively engages the external surface of a hollow cylindrical extension 48 of rotor 8 when the speed of spider 36 is too low. A container 50 is filled with a pressurized gas such as carbon dioxide. The gas cartridge 50 is coupled through a rupturable diaphragm valve 52 to a converging-diverging exhaust nozzle 54. The external surface of rotor 2 is provided with a plurality of recessed semi-circular turbine buckets 56. As will be appreciated by those skilled in the art, a velocity-compounded, re-entry turbine of the Terry type may be provided by employing a plurality of similarly shaped but oppositely directed semi-circular buckets mounted on housing 32 in the region immediately downstream of nozzle 54. Housing 32 which forms the gimbal of my single-degree-of-freedom-gyroscope is supported by ground reaction members 62 and 64 through respective bearings 58 and 60 which engage stub shafts secured to housing 32 in diametral opposition.

Let the rotational speed of rotor 2 be represented by $w_1$, of rotor 8 by $w_2$, of shaft 6 by $w_3$, and let the rotational speed of spider 36 and clutch 44 be represented by $w_4$. Let the ratio of the pitch diameter of ring gear 12 to that of sun gear 14 be represented by $c$. Assuming that rotors 2 and 8 revolve in opposite directions then (1) $$w_3 = \frac{cw_1 - w_2}{c+1}$$

If the relationship between the angular inertia $I_1$ of rotor 2 and the angular inertia $I_2$ of rotor 8 is such that (2) $$\frac{I_1}{I_2} = c$$

then substituting Equation 2 in Equation 1

(3) $$w_3(I_1+I_2) = I_1 w_1 - I_2 w_2$$

In Equation 3 the terms on the right, $I_1 w_1 - I_2 w_2$, represent the net angular momentum of the two rotors; and the term on the left, $w_3(I_1+I_2)$, will be constant provided $w_3$ is maintained constant. Thus from Equation 3 it will be seen that if $w_3$ is maintained constant then the net angular momentum of the two rotors will be constant. In the stored energy gyroscope of FIGURE 1 a change in $w_3$ causes a change in the net angular momentum of the rotors. This requires a ground reaction. Obviously a ground reaction is present when clutch 44 engages member 46. However, when clutch 44 engages member 48 the ground reaction is provided by side gear 34. It is the purpose of differential 37 to provide such ground reaction when clutch 44 engages member 48. It will be noted that for the differential 37 shown, side gears 22 and 34 have equal diameters, so that the speed $w_4$ of spider 36 is one-half the speed of $w_3$ of side gear 22 and shaft 6. Let $e$ be the speed ratio defined by (4) $$w_4 = ew_3$$

Referring now to FIGURE 2 there is shown a developed view for the purposes of illustrating the direction of rotation and torque on the various members when clutch 44 engages member 48 of rotor 8. Arrows directed to the left in FIGURE 2 represent counterclockwise rotations and torques as seen from the right in FIGURE 1. Conversely, arrows directed to the right in FIGURE 2 represent clockwise rotations and torques as seen from the right in FIGURE 1. Rotor 2 always rotates counterclockwise. It is assumed that rotor 8 rotates clockwise. The net angular momentum of the rotors is in the same sense as the direction of rotation of rotor 2 and accordingly $w_3$ is indicated as counterclockwise. Spider 36 is assumed to rotate, as it does in FIGURE 1, in the same direction as shaft 6 and accordingly $w_4$ is counterclockwise. If the rotational speed of shaft 6 drops below its regulated value then the speed of spider 36, being proportional to that of shaft 6, drops below its regulated value. Accordingly clutch 44 engages member 48 secured to rotor 8. Let the torque be represented by T. Since $w_2$ and $w_4$ are oppositely directed, the torque reaction on member 48 and rotor 8 is counterclockwise in opposition to the direction $w_2$ while the torque on clutch 44 and side gear 36 is clockwise in opposition to $w_4$. The clockwise torque on side gear 36 is divided by differential 37 into a first clockwise torque $eT$ upon side gear 22, shaft 6, and planet carrier 16 and a second clockwise torque $(1-e)T$ upon side gear 34. It will be noted that the input torque T to spider 36 appears as two torques, $eT$ and $(1-e)T$, the sum of which is equal to the input torque T. The clockwise torque on side gear 34 causes counterclockwise reaction torque of equal magnitude upon the grounded end plate 30. The planetary differential 15 apportions the clockwise input torque $eT$ upon planet carrier 16 into a first clockwise torque $$\frac{ceT}{c+1}$$

upon ring gear 12 which is coupled to rotor 2 and a second clockwise torque $$\frac{eT}{c+1}$$

upon sun gear 14 which is coupled to rotor 8. It will be noted that the sum of the output torques $$\frac{ceT}{c+1}$$

and $$\frac{eT}{c+1}$$

is equal to the input torque $eT$. The net torque upon rotor 8 will always be counterclockwise in opposition to the direction of rotation $w_2$ and is equal to the difference between the counterclockwise torque T upon member 48 and the clockwise torque $$\frac{eT}{c+1}$$

on sun gear 14. The net counterclockwise torque on rotor 8 is $$\frac{(c+1-e)T}{c+1}$$

The correctness of the distribution of torques in side gear differential 37 and planetary differential 15 may readily be verified by equating the input and output powers transmitted through the two differentials. Let $T_1$ represent the net torque on rotor 2 and $T_2$ the net torque on rotor 8. Then (5) $$\frac{T_1}{T_2} = \frac{ce}{c+1-e}$$

In order that the application of a torque T between clutch 44 and member 48 result in an increase in the speed of $w_3$ and the net angular momentum of the rotors, it is necessary that $T_1/T_2$ be less than unity. From Equation 5 this requires that $e$ be less than unity. A more simple approach is to note that an increase in counterclockwise angular momentum may be obtained only by a counterclockwise ground reaction upon end plate 30. Since the counterclockwise ground reaction is $(1-e)T$ it is immediately apparent that $e$ must be less than unity. If $e=1$ then no ground reaction is provided. If $e$ is greater than unity then the ground reaction on member 30 is clockwise tending to reduce the net angular momentum of the rotors.

In operation of my gyroscope and referring now to FIGURE 4, at time $t=0$ the diaphragm valve 52 is ruptured by application of an appropriate electrical signal. Pressurized gas in container 50 is now released and expands through nozzle 54, impinging on rotor buckets 56 producing a counterclockwise rotation of rotor 2. Since the rotational speed of spider 36 is initially zero, clutch 44 engages member 48; and the speeds $w_2$ and $w_4$ increase at the same rate between $t_0$ and $t_1$. At time $t_1$ then, $w_1=7$, $w_3=6$, and $w_2=w_4=3$. All members are rotating counterclockwise. At time $t_1$ clutch 44 disengages member 48 and engages member 46, maintaining the speeds $w_3$ and $w_4$ constant at respective values of 6 and 3. As $w_1$ increases from 7 to 12, $w_2$ decreases from $+3$ to $-12$. At time $t_2$ the rotor speeds $w_1$ and $w_2$ are of equal magnitude but opposite direction, whereupon the gas in cartridge 50 is exhausted. The speeds $w_1$ and $w_2$ of 12 may correspond to $w_m$ which represents the hoop stress limit in the rims of rotors 2 and 8. It will be noted that at time $t_2$ the rotors are operating at their stress limiting speed $w_m$ and hence store the maximum possible kinetic energy. Let $$w_3 = mw_m$$

In FIGURES 1 and 4, $w_3=6$, $w_m=12$, and hence $m=\frac{1}{2}$.
In FIGURE 4 the time scale is nonlinear since the rates of change of rotational speed with time will not, in general, be linear functions. As kinetic energy is gradually dissipated in windage and friction losses $w_3$ would tend to decrease below 6 and $w_4$ would tend to decrease below $ew_3 = \frac{1}{2}(6) = 3$. However, clutch 44 engages member 48 applying a ground reaction which increases the speeds $w_3$ and $w_4$ maintaining them constant. It will be noted that as time progresses, $w_2$ becomes zero and then increases positively; that is, the direction of rotation of $w_2$ changes from clockwise to counterclockwise. At time $t_3$ the counterclockwise rotational velocity $w_2$ of rotor 8 becomes equal to the speed $w_4$ of spider 36. This represents the limit of control after which the speeds $w_1$, $w_2$, $w_3$, and $w_4$ all decay toward zero with the speed $w_1$ being seven-sixths $w_3$ and the speeds $w_2$ and $w_4$ being equal to each other and to one-half of $w_3$ as occurred during the period of acceleration between $t_0$ and $t_1$. It will be noted that if $e$ is increased from a value of one-half to a larger value approaching unity then $w_4$ would approach $w_3$; and the control limit would be somewhat extended as indicated by the dotted lines for the degenerate case where $e=1$. However, as previously indicated a value $e=1$ provides no ground reaction. Thus the provision of a ground reaction requires that the control limit intervene before the speeds $w_1$ and $w_2$ are equal. The value of $e$ therefore is a compromise. As $e$ closely approaches unity in an attempt to use the maximum amount of free energy represented by the difference in rotor speeds, then the imposition of clutch torques wastefully dissipates much of the available free energy in providing ground reactions. If the value of $e$ is far removed from unity, then the unusable free energy at the control limit is high, but the dissipation of free energy in providing ground reactions from clutch torques is low.

Referring now to FIGURES 1a and 3, clutch 44 may engage rotor 2 instead of rotor 8. This requires that members 46 and 48 and side gear differential 37 be eliminated. Instead end plate 26 is provided with a hollow cylindrical extension 46a. Rotor 2 is provided with a hollow cylindrical extension 48a. Sun gear 34a is formed integrally with end plate 26. Clutch 44 operates between the interior of the outer cylinder 46a and the exterior of the inner cylinder 48a. Clutch 44 is secured to a ring gear 22a which is mounted for rotation relative to shaft 6 on bearings 66. Shaft 6 is directly coupled to a planet carrier 36a. Planet pinions 40a and 42a engage the sun gear 34a and ring gear 22a and are rotatably mounted on stub shafts secured to the planet carrier 36a of this alternate differential 37a. With the foregoing construction if the ratio of the diameter of the ring gear to that of the sun gear is six, then the speed of ring gear 22a and of clutch 44 will be seven-sixths that of shaft 6. Thus $$w_4 = \frac{7}{6} w_3$$

and $e=\frac{7}{6}$. In FIGURE 3, $w_1$ and $w_4$ represent counterclockwise rotations with $w_1$ exceeding $w_4$. If the speed $w_4$ drops below its regulated value then clutch 44 engages member 48a secured to rotor 2. A clockwise torque T is applied to rotor 2 tending to slow it down. A corresponding counterclockwise torque T is applied to the ring gear 22a, which appears as a counterclockwise torque $eT$ on carrier 36a and a counterclockwise torque $(1-e)T$ on the sun gear 34a. The corresponding ground reaction on end plate 26 is a clockwise torque of magnitude $(1-e)T$. The torque on carrier 36a is coupled through shaft 6 to the planet carrier 16 of the planetary differential 15 which in turn produces a counterclockwise torque $$\frac{eT}{c+1}$$

on sun gear 14 which is coupled to rotor 8 and a counterclockwise torque $$\frac{ceT}{c+1}$$

on ring gear 12 which is coupled to rotor 2. The net torque on rotor 2 is assumed to be clockwise and of a magnitude $$\frac{(c+1-ce)T}{c+1}$$

The ratio of torques on the rotors is (6) $$\frac{T_1}{T_2} = \frac{c+1-ce}{e}$$

Again $T_1/T_2$ must be less than unity if the net angular momentum of the rotors is to be increased. From Equation 6 this requires that $e$ be greater than unity. It will also be noted that a counterclockwise ground reaction on end plate 26 requires a value of $e$ greater than unity.

Referring again to FIGURE 4, with the use of the alternate planetary differential 37a so that $e=\frac{7}{6}$, the velocities $w_1$, $w_2$, and $w_3$ all remain the same as a function of time. Between time $t_0$ and time $t_1$ clutch 44 engages member 48a; and the speeds $w_1$ and $w_4$ increase at the same rate. At time $t_1$ then $w_4=w_1=7$. From $t_1$ to $t_3$, $w_4$ remains constant at 7. At time $t_3$ the speed $w_1$ of rotor 2 has decreased to that of $w_4$ so that the engagement of clutch 44 with the member 48a no longer produces a control torque. It will be noted that the control limit for $e=\frac{1}{2}$ with clutch 44 engaging rotor 8 is the same as $e=\frac{7}{6}$ with clutch 44 engaging rotor 2. Substituting $e=\frac{1}{2}$ in Equation 5 we obtain $$\frac{T_1}{T_2} = \frac{3(\frac{1}{2})}{3+1-\frac{1}{2}} = \frac{3}{7}$$

Substituting $e=\frac{7}{6}$ in Equation 6, $$\frac{T_1}{T_2} = \frac{3+1-3(\frac{7}{6})}{\frac{7}{6}} = \frac{3}{7}$$

Thus the ratio of torques coupled to the two rotors is the same irrespective of the clutching to either rotor 2 or rotor 8 provided appropriate values of $e$ are employed. It will be further noted from FIGURE 4 that corresponding values of $e$ which produce the same control limit also produce the same ratio of torques on the rotors. However, the embodiment of FIGURES 1 and 2 is generally to be preferred to that of FIGURES 1a and 3 since the clutching to rotor 8 produces a greater ground reaction torque for the same clutch torque. In FIGURE 2 the ground reaction torque on member 30 is $(1-\frac{1}{2})T=T/2$ while in FIGURE 3 the ground reaction torque is $(\frac{7}{6}-1)T=T/6$. Thus the embodiment of FIGURE 2 offers three times more ground reaction torque for the same clutch torque. Since the clutch torque depends on the error in angular velocity, it follows that the embodiment of FIGURE 2 provides better speed regulation.

The speed $w_3$ and hence the value of $m$ are determined from the length of time the gyroscope must operate. For a mission of extremely short duration, the value of $m$ may closely approach unity, advantageously resulting in a high net angular momentum and a correspondingly low drift rate. For a mission of longer duration, the value of $m$ must be reduced, resulting in a lower net angular momentum and a correspondingly higher drift rate. Thus $m$ should have the largest possible value consistent with the required operating period of the gyroscope.

In order that both rotors may simultaneously approach their hoop stress limiting speed $w_m$, the differential gearing between the rotors must provide the speed ratio $c$ where (7) $$c = \frac{1+m}{1-m}$$

Solving Equation 7 for $m$, we obtain (8) $$m = \frac{c-1}{c+1}$$

Referring now to FIGURE 5, there is shown a longer duration but lower quality gyroscope where $$c = \frac{I_1}{I_2} = 2$$

and $$m = \frac{w_3}{w_m} = \frac{1}{3}$$

In such event rotor 2 would have only twice the axial length of rotor 8; and the diameter of ring gear 12 would be only twice that of sun gear 14. If clutch 44 operates on the low inertia rotor 8 then the diagram of FIGURE 2 applies. It is assumed that $w_4 = -w_3$ and consequently $e = -1$. From FIGURE 2 it will be noted that a negative value of $e$ is permissible since this augments the counter-clockwise ground reaction on member 30. A negative factor for $e$ represents a simple reversal in direction of rotation, requiring an idler gear. Referring now to FIGURE 1b, there is shown the direction reversing gears 37b. A side gear 34b is coupled to shaft 6 adjacent housing 30. A single idler pinion 42b is rotationally mounted on a stub shaft secured to the interior wall of member 46. Clutch 44 is connected to a side gear 22b of equal diameter to 34b which is rotationally mounted on shaft 6 by bearings 72. In operation of the gyroscope of FIGURE 5 for $e = -1$, between time $t_0$ and time $t_1$ the speed $w_1$ increases from 0 to 8; the speed $w_3$ increases from 0 to 4; and the speeds $w_2$ and $w_4$ decrease from 0 to $-4$. At time $t_1$ clutch 44 disengages member 48 and engages member 46, maintaining the speeds $w_3$ and $w_4$ at respective values of $+4$ and $-4$. Between $t_1$ and $t_2$ speed $w_1$ increases from 8 to 12 while speed $w_2$ decreases from $-4$ to $-12$. At time $t_2$ both rotors reach their hoop stress limits. Since the gas cartridge 50 is exhausted at time $t_2$, clutch 44 lightly engages member 48 between $t_2$ and $t_3$. At $t_3$ the speeds $w_2$ and $w_4$ are equal so that the engagement of clutch 44 with member 48 no longer produces a ground reaction torque, thus terminating the useful period of the gyroscope. In FIGURE 5 it will be noted that for $e = -1$, the ground reaction is $2T$, whereas in FIGURE 4 for $e = \frac{1}{2}$ the ground reaction is only $T/2$. However, in FIGURE 4, at the control limit $t_3$ very little differential kinetic energy exists between rotors 2 and 8, whereas in FIGURE 5 considerable differential kinetic energy appears between the rotors at the control limit $t_3$.

If in FIGURE 5 clutch 44 engages rotor 2 instead of rotor 8 then FIGURES 1a and 3 apply. In order to obtain the same control limit at $t_3$ it is required that $e = 2$. In FIGURE 1a, for $e = 2$, the planetary differential 37a should be replaced by a side gear differential comprising two side gears of equal diameter and a spider. One side gear should be formed integrally with end plate 26 (as in sun gear 34a); the other side gear should be rotationally mounted on shaft 6 and carry clutch 44 (as does ring gear 22a); and the spider should be connected to shaft 6 (as is carrier 36a). Substituting $c = 2$ and $e = -1$ in Equation 5 we obtain $$\frac{T_1}{T_2} = \frac{2(-1)}{2 + 1 - (-1)} = -\frac{1}{2}$$

Substituting $c = 2$ and $e = 2$ in Equation 6 we obtain $$\frac{T_1}{T_2} = \frac{2 + 1 - 2(2)}{2} = -\frac{1}{2}$$

A negative value $$\frac{T_1}{T_2}$$

signifies that the application of a clutch torque results in an increase in the speed $w_1$.

In operation of the gyroscope of FIGURE 5 for $e = 2$, between $t_0$ and $t_1$, $w_1$ and $w_4$ both increase from 0 to 8. At time $t_1$ clutch 44 disengages member 48a and engages member 46a, maintaining the speeds $w_4$ and $w_3$ at respective values of 8 and 4. At the control limit $t_3$ the speeds $w_1$ and $w_4$ are again equal so that no ground reaction may be produced. In FIGURE 5 for $e = 2$ the ground reaction is $T$, which is the same as the clutch torque. It will be recalled that in FIGURE 4 for $e = \frac{1}{3}$ the ground reaction is only $T/6$. In FIGURE 5, as in FIGURE 4, the coupling of clutch 44 to rotor 8 instead of rotor 2 results in the greater ground reaction for the same clutch torque.

Since a positive value $T_1/T_2$ signifies that the application of a clutch torque decreases the speed $w_1$ and a negative value $T_1/T_2$ signifies that the application of a clutch torque increases the speed $w_1$, a value $$\frac{T_1}{T_2} = 0$$

signifies that the application of a clutch torque results in no change in the speed $w_1$. In Equation 5, for $$\frac{T_1}{T_2} = 0, \quad e = 0$$

This means that the speed $w_4 = ew_3 = 0$. This is a degenerate case since clutch 44 would be coupled to a member having no rotational velocity and accordingly would not be subjected to the required centrifugal forces necessary for regulating the net angular momentum. However in Equation 6 for $$\frac{T_1}{T_2} = 0, \quad e = \frac{c+1}{c}$$

Thus in FIGURE 4 where $c = 3$, for $$\frac{T_1}{T_2} = 0, \quad e = \frac{3+1}{3} = \frac{4}{3}$$

and in FIGURE 5 where $c = 2$, for $$\frac{T_1}{T_2} = 0, \quad e = \frac{2+1}{2} = \frac{3}{2}$$

When the value of $e$ is chosen so that $$\frac{T_1}{T_2} = 0$$

the control limit now occurs where the speed $w_2$ passes through 0 as indicated in FIGURES 4 and 5 at $t_x$. Thus the embodiment of FIGURES 1a and 3 must be employed for $$\frac{T_1}{T_2} = 0$$

and clutch 44 must operate on rotor 2.

From FIGURES 4 and 5 in order to provide a properly directed clutch torque and corresponding ground reaction, it will be appreciated that $w_4$ must be less than $+w_m$ in FIGURE 3 but greater than $-w_m$ in FIGURE 2. Accordingly in Equation 5

(9) $\qquad 1 > e > -1/m$ (but $e \neq 0$)

and in Equation 6

(10) $\qquad 1 < e < 1/m$

Substituting the value $e = -1/m$ from Equation 9 into Equation 8 we obtain $$e = -\frac{c+1}{c-1}$$

Employing this value in Equation 5 we find $$\frac{T_1}{T_2} = -1$$

Similarly by substituting the value $e = 1/m$ from Equation 10 into Equation 8 we obtain $$e = \frac{c+1}{c-1}$$

Employing this value in Equation 6 we again find $$\frac{T_1}{T_2} = -1$$

Thus in all stored energy embodiments of my invention

(11) $\qquad 1 > \frac{T_1}{T_2} > -1$

It will be understood that in gyroscopes constantly energized by motors of poor regulation such as alternating current induction motors or direct current motors a ground reaction is supplied by the motor itself. Moreover in gyroscopes constantly driven by conventional atmospheric vacuum systems, the speed regulation is poor; but the air jet (as from nozzle 54) does supply a ground reaction. In such gyroscopes where a driving sources continually supplies a ground reaction, $e$ may be unity; no auxiliary gearing (37, 37a, 37b) is required; and clutch 44 may be directly connected to shaft 6. Clutch 44 may operate either between grounding member 46 and member 48 of rotor 8 or between grounding member 46a and member 48a of rotor 2. It will be appreciated that when clutch 44 attached to shaft 6 engages either the rotor 2 or the rotor 8, there is no immediate ground reaction. Instead the speeds $w_1$ and $w_2$ approach one another; the speed $w_3$ remains constant; and the net angular momentum remains constant. However the reduction in speed $w_1$ of rotor 2 causes an increase in the motor torque or air jet torque applied to rotor 2. This produces the required ground reaction which increases the net angular momentum.

It will be seen that I have accomplished the objects of my invention. I have provided a stored energy gyroscope wherein substantially all the energy at the end of the useful time period is employed gyroscopically. All rotating elements are mounted on the gimbal. My constant angular momentum gyroscope may be employed with motive devices of poor speed regulation.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, what I claim is:

1. A constant angular momentum gyroscope including in combination a first rotor having a moment of inertia $I_1$, a second rotor having a moment of inertia $I_2$, the rotors having a maximum permissible angular velocity $w_m$, a gimbal, means journaling both rotors in the gimbal, a differential speed device comprising first and second and third relatively rotatable members and providing the speed relationship $$w_3 = \frac{cw_1 \pm w_2}{c+1}$$

where $w_1$ and $w_2$ and $w_3$ are the respective speeds of the first and second and third members and where $$\frac{I_1}{I_2} = c$$

means coupling the first member and the first rotor, means coupling the second member and the second rotor, a fourth rotatable member, a speed changing device comprising the third and fourth members and providing the relationship $w_4 = ew_3$, where $w_4$ is the rotational speed of the fourth member and where $e$ has a value other than positive unity and zero which is less than $$\frac{c+1}{c-1}$$

but greater than $$-\frac{c+1}{c-1}$$

and means comprising means coupling the fourth member selectively to one rotor and the gimbal for maintaining constant the speed of the third member at such value that $$w_3 = \frac{c-1}{c+1} w_m$$

2. A constant angular momentum gyroscope including in combination a first rotor having a moment of inertia $I_1$, a second rotor having a moment of inertia $I_2$, a differential speed device comprising first and second and third relatively rotatable members providing the speed relationship $$w_3 = \frac{cw_1 \pm w_2}{c+1}$$

where $w_1$ and $w_2$ and $w_3$ are the respective speeds of the first and second and third members and where $$\frac{I_1}{I_2} = c$$

means coupling the first member and the first rotor, means coupling the second member and the second rotor, a fourth rotatable member, a speed changing device comprising the third and fourth members and providing the relationship $w_4 = ew_3$, where $w_4$ is the rotational speed of the fourth member and where $e$ has an absolute value which is less than $$\frac{c+1}{c-1}$$

and means for maintaining constant the speed of the fourth member.

3. A constant angular momentum gyroscope including in combination a first rotor having a moment of inertia $I_1$, a second rotor having a moment of inertia $I_2$, the rotors having a maximum permissible speed $w_m$, a differential speed device comprising first and second and third relatively rotatable members and providing the speed relationship $$w_3 = \frac{cw_1 \pm w_2}{c+1}$$

where $w_1$ and $w_2$ and $w_3$ are the respective speeds of the first and second and third members and where $$\frac{I_1}{I_2} = c$$

means coupling the first member and the first rotor, means coupling the second member and the second rotor, and means for maintaining constant the speed of the third member at such value that $$W_3 = \frac{c-1}{c+1} w_m$$

4. A constant angular momentum gyroscope including in combintaion a first rotor having a moment of inertia $I_1$, a second rotor having a moment of inertia $I_2$, a differential speed device comprising first and second and third relatively rotatable members and providing the speed relationship $$w_3 = \frac{cw_1 \pm w_2}{c+1}$$

where $w_1$ and $w_2$ and $w_3$ are the respective speeds of the first and second and third members and where $$\frac{I_1}{I_2} = c$$

means coupling the first member and the first rotor, means coupling the second member and the second rotor, and means for maintaining constant the speed of the third member.

5. A constant angular momentum gyroscope including in combination a first rotor, a second rotor, a differential speed device comprising first and second and third relatively rotatable members, means coupling the first member and the first rotor, means coupling the second member and the second rotor, a fourth rotatable member, a speed changing device comprising the third and fourth members and providing the relationship $w_4 = ew_3$, where $w_3$ and $w_4$ are the respective rotational speeds of the third and fourth members and where $e$ has a value other than positive unity and zero, and means for maintaining constant the speed of the fourth member.

6. A constant angular momentum gyroscope including in combination a first rotor, a second rotor, a differential speed device comprising first and second and third relatively rotatable members, means coupling the first member and the first rotor, means coupling the second member and the second rotor, the first member rotating in the same direction as and with a greater angular velocity than the third member, a fourth rotatable member, a speed changing device comprising the third and fourth members and providing the relationship $w_4 = ew_3$, where $w_3$ and $w_4$ are the respective rotational speeds of the third and fourth members and where $e$ has a value other than zero which is less than positive unity, and means for selectively coupling the fourth member and the second rotor.

7. A constant angular momentum gyroscope including in combination a first rotor, a second rotor, a differential speed device comprising first and second and third relatively rotatable members, means coupling the first member and the first rotor, means coupling the second member and the second rotor, the first member rotating in the same direction as and with a greater angular velocity than the third member, a fourth rotatable member, a speed changing device comprising the third and fourth members and providing the relationship $w_4 = ew_3$, where $w_3$ and $w_4$ are the respective rotational speeds of the third and fourth members and where $e$ is greater than positive unity, and means for selectively coupling the fourth member and the first rotor.

8. A constant angular momentum gyroscope including in combination a first rotor, a second rotor, a gimbal, means journaling both rotors in the gimbal, a differential speed device comprising first and second and third relatively rotatable members, means coupling the first member and the first rotor, means coupling the second member and the second rotor, and means for coupling the third member selectively to one rotor and the gimbal.

9. A constant angular momentum gyroscope including in combination a first rotor, a second rotor, a gimbal, means journalling both rotors in the gimbal, a differential speed device comprising a first member and a second member and a third member, said members being relatively rotatable, means coupling the first member and the first rotor, means coupling the second member and the second rotor, means for driving one of the rotors, and means comprising a centrifugal clutch driven by the third member for maintaining constant the angular velocity of the third member.

10. A constant angular momentum gyroscope including in combination a first rotor having an angular momentum, a second rotor having an angular momentum which is less than that of the first rotor, and means for applying such torques to the rotors that the ratio of the first rotor torque to the second rotor torque is less than positive unity but greater than negative unity.

11. A constant angular momentum gyroscope including in combination a first rotor, a second rotor, a gimbal, means journalling both rotors in the gimbal, and means for differentially controlling the speeds of the rotors to maintain constant their net angular momentum.

References Cited

UNITED STATES PATENTS

| | | | |
|---|---|---|---|
| 1,603,352 | 10/1926 | Paxton | 74—5.37 |
| 2,345,915 | 4/1944 | Carlson | 74—5.7 X |
| 2,627,414 | 2/1953 | Sear | 74—572 X |
| 2,999,391 | 9/1961 | Freebairn et al. | 74—5.37 |

MILTON KAUFMAN, *Primary Examiner.*

J. D. PUFFER, C. J. HUSAR, *Assistant Examiners.*